US009242312B2

(12) United States Patent  
Gillen (10) Patent No.: US 9,242,312 B2  
(45) Date of Patent: Jan. 26, 2016

(54) LASER MACHINING USING A SURFACTANT FILM

(75) Inventor: David Gillen, Clontarf (IE)

(73) Assignee: Electro Scientific Industries, Inc., Portland, OR (US)

( * ) Notice: Subject to any disclaimer, the term of this patent is extended or adjusted under 35 U.S.C. 154(b) by 1693 days.

(21) Appl. No.: 10/559,442

(22) PCT Filed: Jun. 3, 2004

(86) PCT No.: PCT/EP2004/006001

§ 371 (c)(1),  
(2), (4) Date: Oct. 3, 2006

(87) PCT Pub. No.: WO2004/110694

PCT Pub. Date: Dec. 23, 2004

(65) Prior Publication Data

US 2007/0090099 A1 Apr. 26, 2007

(30) Foreign Application Priority Data

Jun. 6, 2003 (GB) .................................... 0313115.8  
Jan. 13, 2004 (GB) .................................. 0400677.1

(51) Int. Cl.  
*B23K 26/16* (2006.01)  
*B23K 26/00* (2014.01)  
(Continued)

(52) U.S. Cl.  
CPC ................. *B23K 26/18* (2013.01); *B23K 26/16* (2013.01); *Y10T 428/265* (2015.01); *Y10T 428/31504* (2015.04)

(58) Field of Classification Search  
CPC .. B23K 26/18; B23K 26/385; B23K 26/4025; B23K 26/4005; B23K 26/0853; B23K 26/38; B23K 26/381; B23K 26/032; B23K 26/367; B23K 26/4075; B23K 26/0884; B23K 26/422; B23K 26/0042; B23K 26/0057; B23K 26/0063; B23K 26/0869; B23K 26/16; Y10T 428/265; Y10T 428/31504  
USPC ............. 428/336, 411.1; 219/121.67–121.69, 219/121.72, 121.85, 121.71; 438/460–465  
See application file for complete search history.

(56) References Cited

U.S. PATENT DOCUMENTS 4,532,403 A * 7/1985 Jordan et al. ............. 219/121.14  
5,601,645 A 2/1997 Nonomura  
(Continued)

FOREIGN PATENT DOCUMENTS

GB 2157608 10/1985  
JP 53-047270 B 4/1978  
(Continued)

OTHER PUBLICATIONS

Sharp C M et al, "A Novel Anti-Spatter Technique for Laser Drilling: Applications to Surface Texturing", Proceedings of Icaleo, vol. 83, No. Part 1, 1997, pp. 41-50.

(Continued)

*Primary Examiner* — Hung D Nguyen  
(74) *Attorney, Agent, or Firm* — Stoel Rives LLP (57) ABSTRACT

A surface of a workpiece (12) to be laser machined is protected by a surfactant film (11) form debris (15) produced during machining with a laser beam (14) by reducing adherence to the surface of debris produced by the laser machining. The surfactant film is preferably subsequently removed together with debris (151) deposited thereon.

20 Claims, 5 Drawing Sheets

(51) Int. Cl.
   *B32B 27/00* (2006.01)
   *B23K 26/18* (2006.01)

(56) References Cited

U.S. PATENT DOCUMENTS

| | | | |
|---|---|---|---|
| 5,641,416 A * | 6/1997 | Chadha | 219/121.69 |
| 5,934,973 A * | 8/1999 | Boucher et al. | 451/5 |
| 6,048,671 A | 4/2000 | Hatakeyama et al. | |
| 6,344,402 B1 * | 2/2002 | Sekiya | 438/460 |
| 6,362,453 B1 | 3/2002 | Wang et al. | |
| 6,998,571 B2 | 2/2006 | Sekiya et al. | |
| 2002/0007913 A1 * | 1/2002 | Gonzales et al. | 156/345 |
| 2002/0031899 A1 * | 3/2002 | Manor | 438/460 |
| 2002/0170891 A1 * | 11/2002 | Boyle et al. | 219/121.67 |
| 2002/0189643 A1 * | 12/2002 | Chen et al. | 134/6 |
| 2003/0052098 A1 | 3/2003 | Kim et al. | |
| 2003/0108762 A1 * | 6/2003 | Hamann et al. | 219/121.71 |
| 2004/0112880 A1 * | 6/2004 | Sekiya | 219/121.69 |
| 2004/0137700 A1 * | 7/2004 | Sekiya | 438/460 |
| 2004/0211762 A1 * | 10/2004 | Sekiya et al. | 219/121.82 |
| 2006/0105544 A1 | 5/2006 | Takanashi et al. | |

FOREIGN PATENT DOCUMENTS

| | | |
|---|---|---|
| JP | S53-047270 A | 4/1978 |
| JP | 57-047933 B | 10/1982 |
| JP | H03-060891 | 3/1991 |
| JP | 05-014432 A | 2/1993 |
| JP | H05-211381 A | 8/1993 |
| JP | H07-106238 A | 4/1995 |
| JP | 7-185875 | 7/1995 |
| JP | H07-185875 A | 7/1995 |
| JP | 8-132260 | 5/1996 |
| JP | H08-132260 | 5/1996 |
| JP | 11-191540 A | 7/1999 |
| JP | 2001-118781 A | 4/2001 |
| JP | 2001-326194 A | 11/2001 |
| JP | 2001-358188 A | 12/2001 |
| JP | 2005-324217 | 11/2005 |
| SU | 1636231 | 3/1991 |
| WO | WO02/076666 | 10/2002 |

OTHER PUBLICATIONS

Abd El Monem Eissa et al., *Synthesis and Evaluation of Nonionic Polymeric Surfactants Based on Acrylated Polyethylene Glycol*, 16 J. Surfact. Deterg. 161, 161-71 (2013).

* cited by examiner

LASER MACHINING USING A SURFACTANT FILM

This invention relates to use of a surfactant film to reduce adhesion of laser machining debris to a workpiece being machined.

During laser machining of, for example, a wafer substrate, some material removed from a machining zone is deposited on a surface of the wafer substrate on which machining is being carried out, for example as debris at the edge of a laser cut. Material ejected from the machining zone during laser machining is in a molten or gaseous form and adheres to the surface of the wafer substrate upon cooling during, and subsequent to, machining. Such adherent debris may, for example, damage thermally-sensitive electronic circuitry on the surface of the wafer substrate as the debris cools upon contact with the surface and re-solidifies. Such re-solidified debris is difficult to remove from the surface of the wafer substrate using conventional wafer cleaning techniques due to its adherent nature.

It is an object of the present invention at least to ameliorate the aforesaid difficulties in the prior art.

According to a first aspect of the present invention there is provided a method of laser machining a workpiece including the steps of: dispensing a surfactant onto a surface of the workpiece to be laser machined to provide a surfactant film to reduce adhesion to the surface of debris produced during laser machining; and laser machining the workpiece from the surface.

Conveniently, the surfactant is dispensed in a pre-wash of the workpiece.

Preferably, the method includes a further step of at least partially drying the surfactant film before laser machining the workpiece.

Advantageously, the step of dispensing a surfactant comprises dispensing a surfactant onto surfaces of a plurality of workpieces in a batch process before the workpieces are laser machined.

Advantageously, the method includes a further step of removing the surfactant film, subsequent to laser machining, together with any debris from the laser machining deposited thereon.

Conveniently, the step of dispensing a surfactant comprises dispensing a surfactant which is soluble in a solvent in which the surface of the workpiece is insoluble and wherein the step of removing the surfactant film comprises dissolving the surfactant film in the solvent.

Advantageously, the solvent is water.

Advantageously, the step of laser machining the workpiece includes at least one of laser scribing, laser dicing and laser via drilling the workpiece.

Conveniently, the step of laser machining the workpiece comprises laser machining a multilayer workpiece.

Conveniently the multilayer workpiece comprises a semiconductor wafer and associated layers forming an active region of the wafer.

Conveniently, the step of dispensing the surfactant comprises spray depositing the surfactant film on the surface.

Alternatively, the step of dispensing the surfactant comprises knife-edge depositing the surfactant film on the surface.

Alternatively, the step of dispensing the surfactant comprises roller depositing the surfactant film on the surface.

Alternatively, the step of dispensing the surfactant comprises immersing the surface of the workpiece in a surfactant solution.

Conveniently, the step of dispensing the surfactant comprises dipping a batch of wafers to be machined into a surfactant solution.

Preferably, the step of dispensing the surfactant comprises dispensing an anionic, non-ionic or amphoteric surfactant.

Preferably, the step of dispensing the surfactant comprises coating the surface with a surfactant film having a sufficiently high degree of wetting to wet substantially all the surface.

Conveniently, the step of laser machining includes optimisation of machining parameters and such optimisation includes seeking to minimise adherence of debris to the surfactant film.

Conveniently, the step of removing the surfactant film comprises a spin-rinse-dry process.

Advantageously, the step of laser machining comprises laser scribing the workpiece and the step of removing the surfactant film comprises at least partially removing the thin film of surfactant and any debris with a coolant used in a subsequent dicing step using a dicing saw.

Advantageously, the step of laser machining comprises providing a gas environment for the laser machining for reducing solid debris created in the laser machining step.

Conveniently, the step of dispensing the surfactant comprises coating the surface with a surfactant dissolved or suspended in a liquid carrier and evaporating the liquid carrier from the surface.

Advantageously, the step of dispensing the surfactant to form a thin film of surfactant comprises the step of acquiring an image of the film of surfactant on the workpiece and comparing the image with a reference image of a workpiece with an optimum thin film of surfactant and where the image is not sufficiently comparable with the reference image washing the surfactant film form the workpiece and redispensing surfactant on the surface of the workpiece.

Advantageously, the step of comparing the image with a reference image includes comparing the image with at least one of a second reference image of a workpiece with an excess of surfactant on a surface and a third reference image of a workpiece with insufficient surfactant on a surface to determine whether the thin film of surfactant is excessive or insufficient respectively.

Advantageously the step of dispensing a surfactant onto a surface of the workpiece comprises a step of using a camera and associated hardware and software to align a wafer on an xy table with machine coordinates of a laser apparatus with which the wafer is to be machined, or with a laser of the laser apparatus, before the surfactant is dispensed on the wafer, such that the surfactant is dispensed on the wafer on the xy table after the wafer has been clamped in position thereon.

Conveniently the step of dispensing a surfactant comprises the steps of: removing a wafer from wafer carrier means; transporting the wafer to a surfactant dispensing station and coating the surface of the wafer with a surfactant film to form a coated wafer; and the step of laser machining comprises transporting the coated wafer to a laser machining station and laser machining the coated wafer to form a machined coated wafer such that debris from the laser machining is deposited on the surfactant film; and the step of removing the surfactant film comprises the steps of transporting the machined coated wafer to a surfactant removal station and removing the surfactant film and the debris deposited thereon to form an uncoated machined wafer.

According to a second aspect of the invention, there is provided a laser machining apparatus comprising surfactant dispensing means arranged for coating a surface of a workpiece to be machined with a surfactant film to reduce adherence to the surface of debris produced during laser machining by the apparatus.

Preferably, the surfactant dispensing means comprises pre-washing means.

Preferably, the laser machining apparatus further comprises surfactant film removal means for removing the surfactant film from the surface together with any debris deposited thereon during laser machining thereof.

Conveniently, the surfactant film removal means comprises spin-rinse-dry means.

Advantageously, the surfactant film removal means comprises post-washing means.

Advantageously, the pre-washing means and the post-washing means are a same washing means.

Preferably, the laser machining apparatus is arranged for at least one of laser scribing, laser dicing and laser via drilling the workpiece.

Conveniently, the surfactant dispensing means comprises spray deposition means.

Alternatively, the surfactant dispensing means comprises knife-edge deposition means.

Alternatively, the surfactant dispensing means comprises roller deposition means.

Alternatively, the surfactant dispensing means comprises immersion means for batch dipping a plurality of workpieces.

Advantageously, the laser machining apparatus further comprises gas environment control means for producing a gas environment for laser machining arranged to reduce solid debris produced in laser machining.

Preferably, the laser machining apparatus further comprises drying means arranged at least partially to dry the surface subsequent to coating the surface.

Conveniently, the laser machining apparatus further comprises imaging means for obtaining an image of the surfactant film on the surface of the workpiece and image comparison means for comparing the image with a least one reference image for determining whether the thin film of the surfactant is sufficiently optimised for laser machining.

Conveniently the surfactant dispensing means comprises a surfactant dispensing station for coating a surface of a workpiece to be laser machined with the surfactant film for reducing adherence to the surface of debris produced during laser machining by producing a coated workpiece; the laser machining apparatus further comprises a laser machining station for machining the coated workpiece; and the surfactant removal means comprise a surfactant film removal station for removing the surfactant film subsequent to laser machining together with any debris from the laser machining deposited thereon; and the laser machining apparatus further comprises transport means for transporting the workpiece from the surfactant dispensing station to the laser machining station and from the laser machining station to the surfactant film coating removal station.

According to a third aspect of the invention there is provided a workpiece coated on at least one surface with a surfactant film arranged to reduce adherence to the at least one surface of debris produced during laser machining of the workpiece.

Preferably, the surfactant film is removable subsequent to laser machining without significantly damaging the at least one surface.

Preferably, the surfactant film is not more than 10 micron thick.

Conveniently, the surfactant film is an anionic, ionic or amphoteric surfactant film.

The invention will now be described, by way of example, with reference to the accompanying drawings in which.

In the Figures, like reference numerals represent like parts.

Figure 1A:
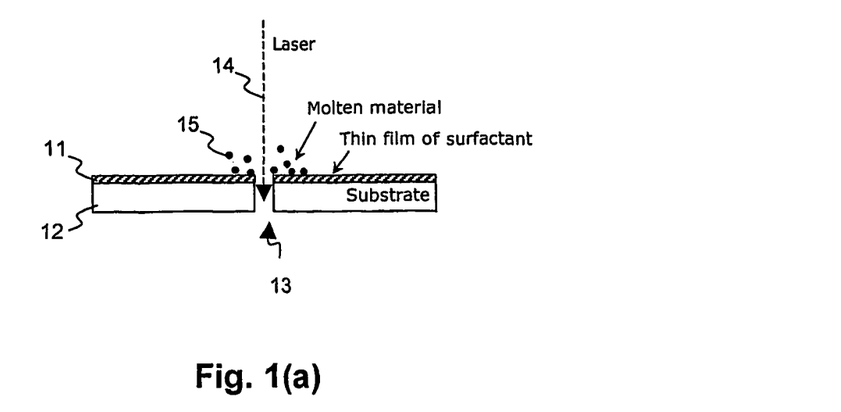
FIG. 1(a) is a vertical cross-sectional view of a pre-washed substrate being laser machined according to a first aspect of the present invention.

Referring to FIG. 1(a), a thin film of surfactant 11, which preferably is water-soluble and an anionic, non-ionic or amphoteric thin film of surfactant with a high degree of surface wetability, is coated on a wafer substrate 12 prior to laser machining with a laser beam 14 at a machining site 13 in the wafer substrate. Preferably, the thin film of surfactant is less than 10 microns thick. The thin film of surfactant 11 has a sufficiently high degree of wetability to ensure that the film uniformly wets the water surface and remains on the wafer surface during machining. Preferably, the surfactant film is applied in a pre-wash of the wafer. Preferably the surface is at least partially dried after the thin film of surfactant has been applied and before laser machining. Alternatively, the wafer substrate is machined while the surface is still wet.

The wafers may be pre-deposited, for example hours or days before laser machining, and then fed into a laser machining apparatus in a normal manner. In addition, a full boat of wafers may be coated by a dipping process or alternative batch process in advance of insertion into the laser machining apparatus.

Figure 1B:
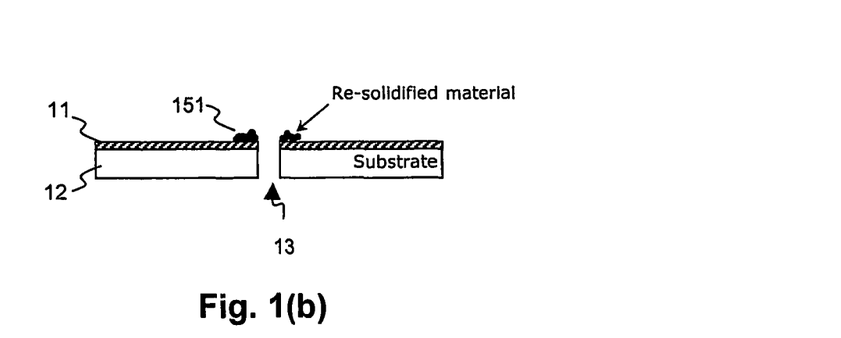
FIG. 1(b) is a vertical cross-section of the substrate of FIG. 1 after machining.

Laser beam parameters, such as wavelength, laser pulse energy, laser repetition rate and scanning velocity of the laser beam 14 over the wafer substrate 12, determine a nature of the debris 15 produced during laser machining. A combination of parameters, such as wavelength, laser pulse energy, laser repetition rate and scanning velocity of the laser beam 14 over the wafer substrate 12, are preferably chosen, subject to other constraints, to produce debris 15 that has low adherence to the thin flm of surfactant upon re-solidification and is therefore more easily removed in a wash process. That is, the presence of the thin film of surfactant on the wafer surface after a pre-wash step reduces the surface adhesive properties thus permitting easier removal of the laser-machined debris. Referring to FIG. 1(a), molten and gaseous material 15 is ejected from the laser machining site 13 during laser machining. Such material moves back toward the wafer surface both during and after laser machining and is deposited on the thin film of surfactant 11 as re-solidified material 151, as shown in FIG. 1(b). However, the surfactant film reduces adherence of the debris to the workpiece, easing subsequent removal of debris from the workpiece. This differs from a known protective coating which physically prevents debris coming into contact with the surface of the wafer by acting as a barrier. In the case of the thin film of surfactant of the invention, the process of physically or chemically bonding debris or laser re-deposited material to the wafer is prevented. That is, if hot material lands on, for example, a bond pad the surfactant acts as an "anti-fluxing" agent. This may be understood as a reverse process to that of a solder flux in which a chemical is added to allow metal to bond better to a metal pad, for example, by chemically stimulating the bonding process at elevated temperature.

Figure 1C:
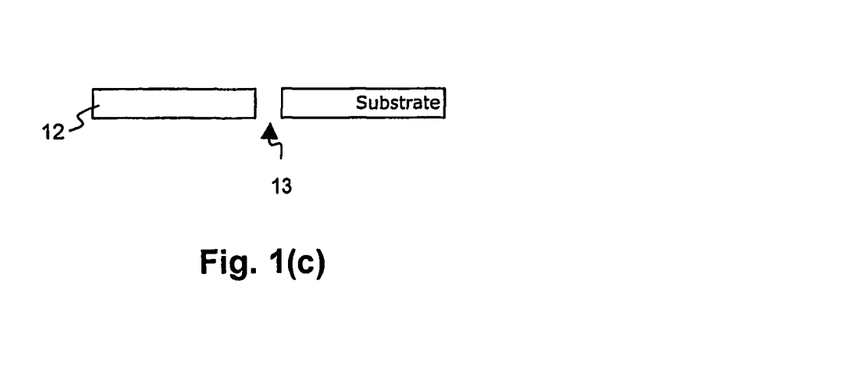
FIG. 1(c) is a vertical cross-section of the substrate of FIG. 2 after removal of debris and a thin film of surfactant.

After laser machining, the wafer substrate 12 is washed using a conventional wash for semiconductor substrates, such as a spin-rinse-dry process with water, and both the thin film of surfactant 11 and re-solidified debris 151 are removed from the wafer surface, leaving the surface clean and undamaged, as shown in FIG. 1(c).

In one embodiment of this invention, laser machining is performed in an active gas environment or in a gas environment where photo-dissociation produces active radicals. Laser machining in an active gas environment can change the chemical nature of debris produced. In particular, a chemical reaction between the active gas and the debris 15 while in a molten state can result in removal of debris in gaseous form, with consequentially reduced deposition of solid debris 151 around the laser machining site 13.

Figure 2:
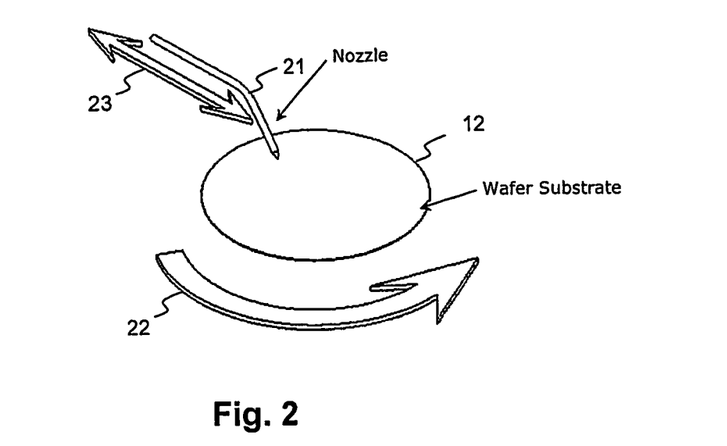
FIG. 2 is a diagrammatic perspective drawing of a spray deposition technique suitable for use in the invention.
Figure 3:
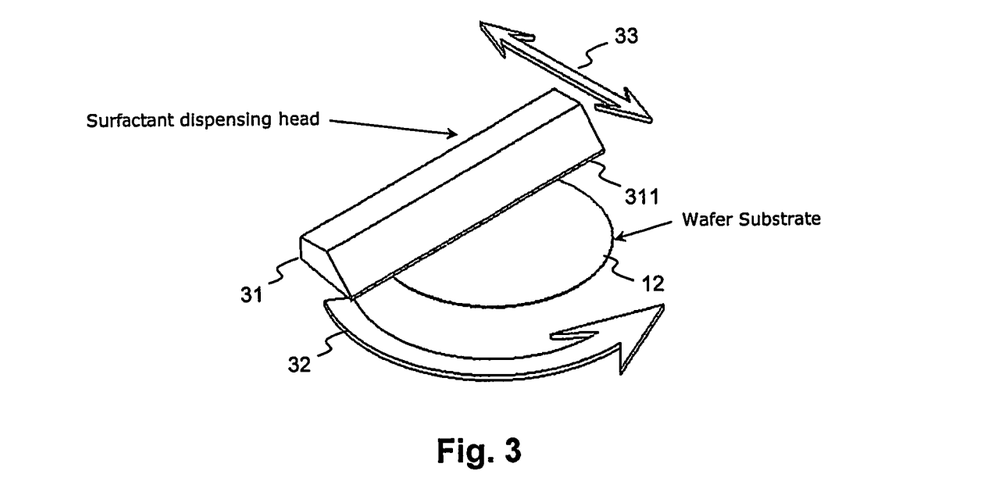
FIG. 3 is a diagrammatic perspective drawing of a knife-edge deposition technique suitable for use in the invention.
Figure 4:
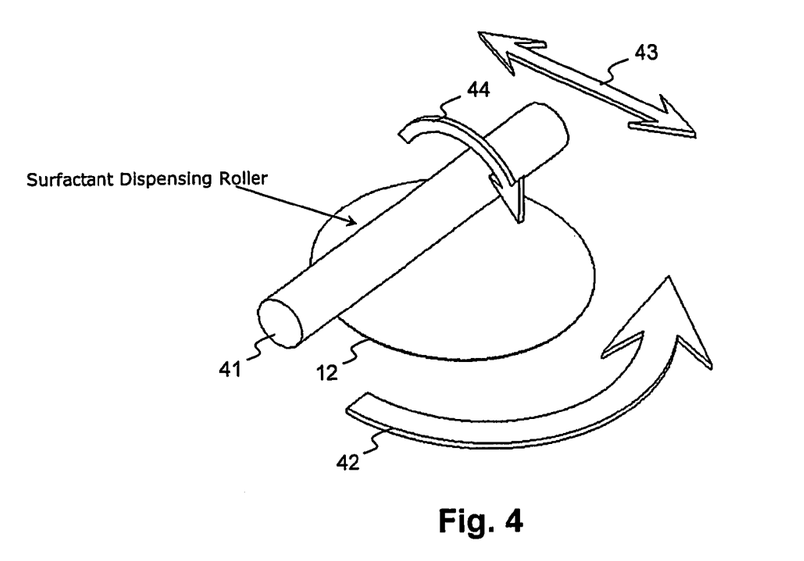
FIG. 4 is a diagrammatic perspective drawing of a roller deposition technique suitable for use in the invention.

Various known techniques are suitable for depositing the thin film of surfactant 11 on the wafer surface, such as spray deposition, knife edge deposition and roller application. Spray deposition is illustrated in FIG. 2 which shows a nozzle 21, for emitting a jet of liquid surfactant, mounted above the wafer substrate 12. The wafer substrate 12 is rotated in the sense of arcuate arrow 22 and the nozzle 21 is translated in the plane of the wafer in direction of double arrow headed line 23 to ensure complete wafer coverage with the liquid surfactant. FIG. 3 illustrates liquid surfactant dispensing through a linear dispensing head 31 via a linear knife edge type nozzle 311 that is at least a same length as a diameter of the wafer substrate 12. As before, rotation of the wafer in the sense of arcuate arrow 32 and translation of the dispensing head 31 in the direction of double arrow headed line 33 in the plane of the wafer permit complete coverage of the wafer with surfactant. Alternatively, as shown in FIG. 4, a roller 41 may be used to dispense surfactant on the wafer substrate 12 by rotation in the sense of arcuate arrow 44 and translation over the wafer surface in the direction of double arrow headed line 43. Again, the wafer substrate 12 may be rotated in the sense of arcuate arrow 42.

A wafer may be placed on an XY table, the wafer aligned and the surfactant solution deposited on the wafer prior to machining, that is the deposition head or mechanism is used on the XY table after the wafer has been clamped in position.

Preferably the surface is at least partially dried subsequent to pre-washing and before laser machining since the thin film 11 is also efficient in reducing the adhesive properties of the substrate 12 when a primary solvent carrying the surfactant has evaporated or where the thin layer is formed by a phase change or congealing of a deposited surfactant solution. Alternatively, the surface may be laser machined with a wet surfactant film.

Alternatively, the thin film of surfactant 11 may be deposited in a batch process. For example, the wafers are pre-deposited, for example hours or days before laser machining, and then fed into a laser machining apparatus in a normal manner. Alternatively, a full boat of wafers may be coated by a dipping process in advance of insertion into the laser machining apparatus.

A laser machining apparatus 50 for carrying out the steps of the method of the invention is illustrated schematically in FIGS. 5 to 9.

Figure 5:
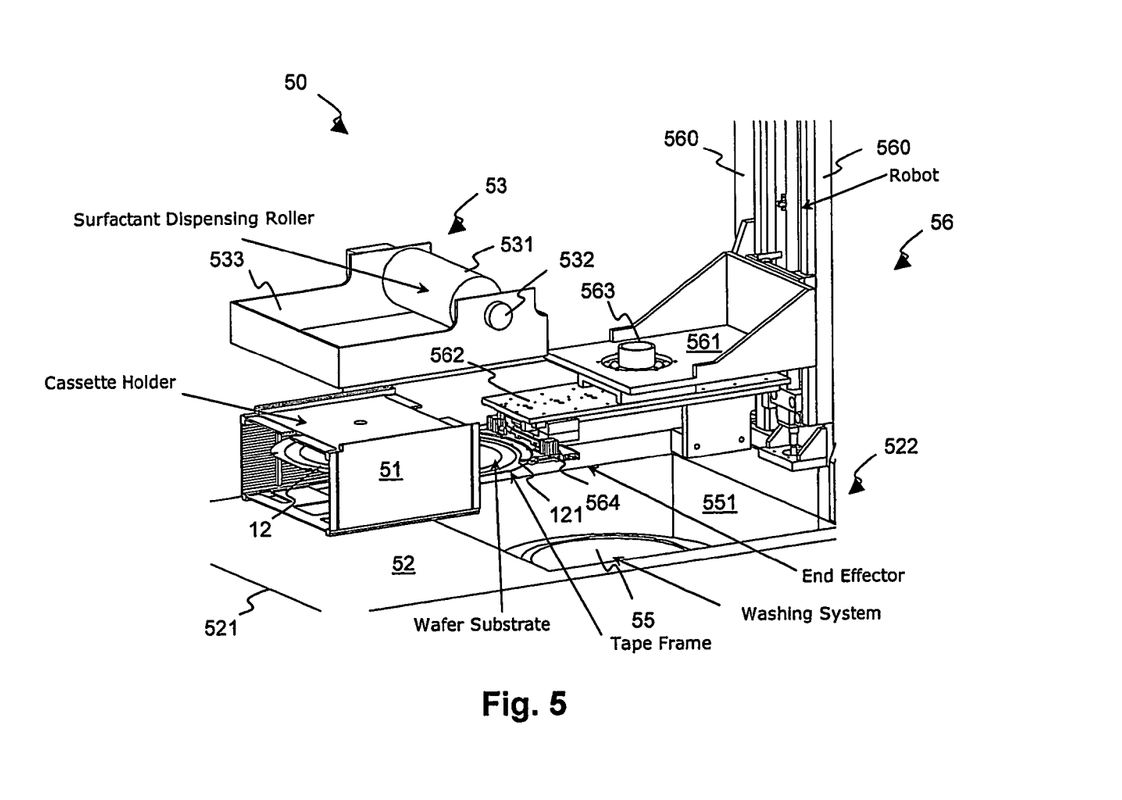
FIG. 5 is a diagrammatic perspective drawing of a laser machining apparatus according to a second aspect of the invention, illustrating removal of a wafer substrate from a cassette holder.

A cassette holder 51, for holding a stack of spaced-apart wafers 12, is located on a table or frame 52 at a first end 521 thereof. The cassette holder 51 is generally cuboid with open opposed vertical ends transverse to a longitudinal axis of the table or frame 52, to provide access to wafers 12 stacked therein.

Spaced generally vertically above, in use, the cassette holder 51 is a surfactant dispensing (pre-wash) station 53 having a roller 531 with an axle 532 transverse to the longitudinal axis of the table or frame 52 and parallel to a plane defined by a surface of the table or frame 52. The roller 531 is partially immersed in a bath 533 for containing surfactant solution to be deposited on a surface of the wafer substrate 12.

The apparatus preferably includes a drying station, not shown, possibly combined with the surfactant dispensing station, for drying the surface subsequent to pre-washing and before laser machining. An infrared lamp, an oven or a warm air jet are examples of suitable means of drying the surface.

Figure 6:
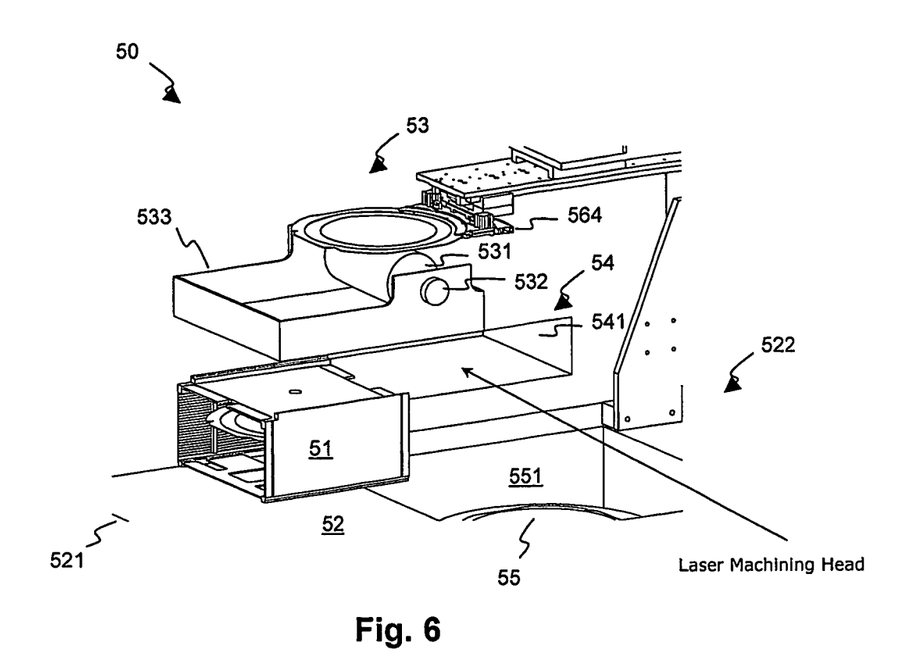
FIG. 6 is a diagrammatic perspective drawing of the laser machining apparatus of FIG. 5, illustrating roller washing of the wafer substrate in order to deposit a thin film surfactant coating.

As best seen in FIG. 6, a laser machining head 54 is located offset from the table or frame 52 corresponding to a position on the table or frame 52 between the cassette holder 51 and a second end 522 of the table or frame 52 opposed to the first end 521. The laser machining head 54 has a vertical access end 541 open for loading wafers to be machined and unloading machined wafers, which is most proximate the table or frame 52 and parallel to the longitudinal axis thereof.

Figure 7:
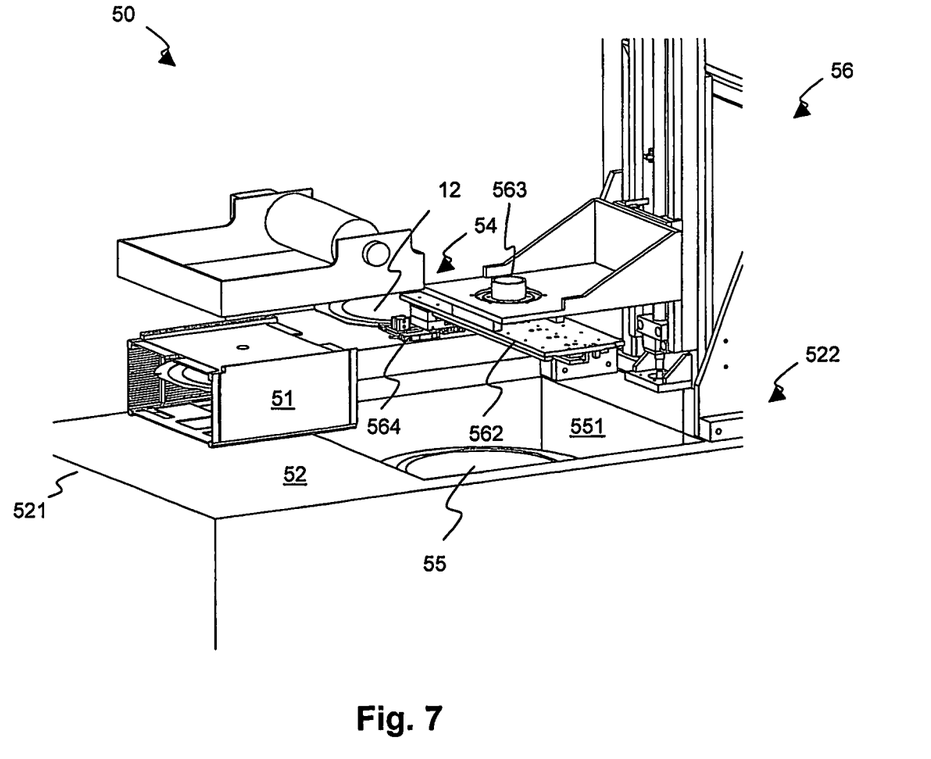
FIG. 7 is a diagrammatic perspective drawing of the laser machining apparatus of FIG. 5, illustrating placing of the wafer substrate in a laser machining head.

As best seen in FIGS. 6 and 7, a coating removal bath 55 is sunk in a well 551 in the table or frame 52 between the cassette holder 51 and the second end 522 of the table or frame 52 and proximate the access end 541 of the laser machining head 54. Alternatively, a same bath may be used for pre-washing to deposit the surfactant on the surface and for post-washing to remove the surfactant film and debris from the surface.

Referring again to FIG. 5, located at the second end 522 of the table or frame 52, proximate the well 551, is a robot 56 having a substantially horizontal, in use, platform 561, vertically movable with respect to the table or frame 52 above the well 551 on vertical, in use, guide rails 560 substantially perpendicular to the surface of the table or frame 52. An end effector carrier 562 is rotatably suspended from the platform 561 by a vertical axle 563 passing through the platform 561 for rotation of the end effector carrier 562 with respect to the platform 561 and substantially parallel to the surface of the table or frame 52.

An end effector 564 is slideably mounted on the end effector carrier 562 for movement with respect to the end effector carrier 562 parallel to a longitudinal axis thereof between an extended position and a retracted position.

FIGS. 5 to 9 illustrate, in sequence, use of the laser machining apparatus to perform the process steps of a complete cycle of the method of the invention of pre-washing a substrate to form a thin film of surfactant on the substrate, laser machining the substrate and, preferably, removing the thin film surfactant from the substrate.

In use, the cassette holder 51 is loaded with wafer substrates 12 to be laser machined. The wafer substrates may optionally be mounted on respective tape frames 121. A selected wafer substrate 12 is removed from the wafer cassette holder 51, as shown in FIG. 5, using the end-effector 564 attached to the robot 56, by locating the platform 561 at a suitable height above the surface of the table or frame 52 to extend the end effector 564, with a longitudinal axis of the end effector carrier 562 parallel to the longitudinal axis of the table or frame 52, towards the cassette holder 51 for the end effector 564 to engage the selected wafer substrate 12 in the cassette holder and by retracting the end effector 564 with the selected wafer substrate 12 held by the end effector 564. Alternatively, a slide mechanism may be used instead of the robot.

The wafer substrate 12, held by the end effector 564, is transported vertically away from the surface of the table or frame 52 by the robot to the pre-wash station 53. The end effector 564 is extended such that a lower, in use, surface of the wafer substrate 12 to be machined engages the roller 531, as shown in FIG. 6. The roller 531 is rotated about the roller axle 532 as the end effector 564 moves the wafer substrate 12 over the roller 531 to wash the lower surface of the wafer substrate 12 in a surfactant solution from the bath 533. Alternative dispensing tools such as a nozzle or knife edge dispenser may alternatively be used, optionally with the wafer being rotated with respect to the dispensing tool during pre-washing.

When pre-washed, the wafer substrate 12 is removed from the pre-wash station 53 by retracting the end effector 564 and lowering the platform 561 and end effector 564 towards the surface of the table or frame 52 to a suitable distance from the surface to position the wafer substrate 12 at a machining position in the laser machining head 54. As shown in FIG. 7, the end effector carrier is rotated through substantially 90° about the axle 563 thereof towards the laser machining head 54. The end effector 564 is extended to pass the pre-washed wafer substrate 12 through the laser machining head access 541 for laser machining of the pre-washed wafer substrate 12, from the lower, in use, pre-washed surface thereof. During laser machining, debris which would otherwise be deposited on the lower surface of the wafer substrate 12 is deposited on the thin film of surfactant.

Figure 8:
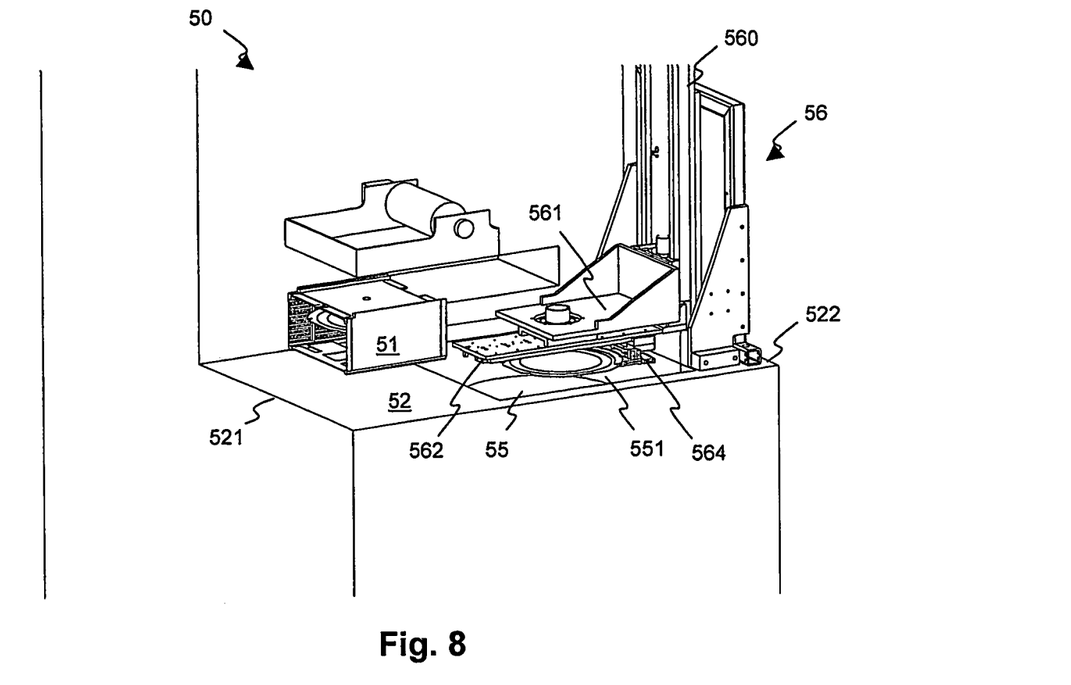
FIG. 8 is a diagrammatic perspective drawing of the laser machining apparatus of FIG. 5, illustrating washing of a wafer substrate subsequent to laser machining to remove debris and the surfactant film.

As shown in FIG. 8, after the laser machining operation is complete the wafer substrate 12 is removed from the laser machining head 54 by retracting the end effector 564 and rotating the end effector carrier 562 through substantially 90° in an opposite sense to that in which the carrier was rotated to load the substrate into the laser machining head and lowering the platform 561 in the direction of the surface of the table or frame 52 to immerse the machined substrate in the washing system 55. Both the surfactant layer and debris are removed during a wash cycle.

Figure 9:
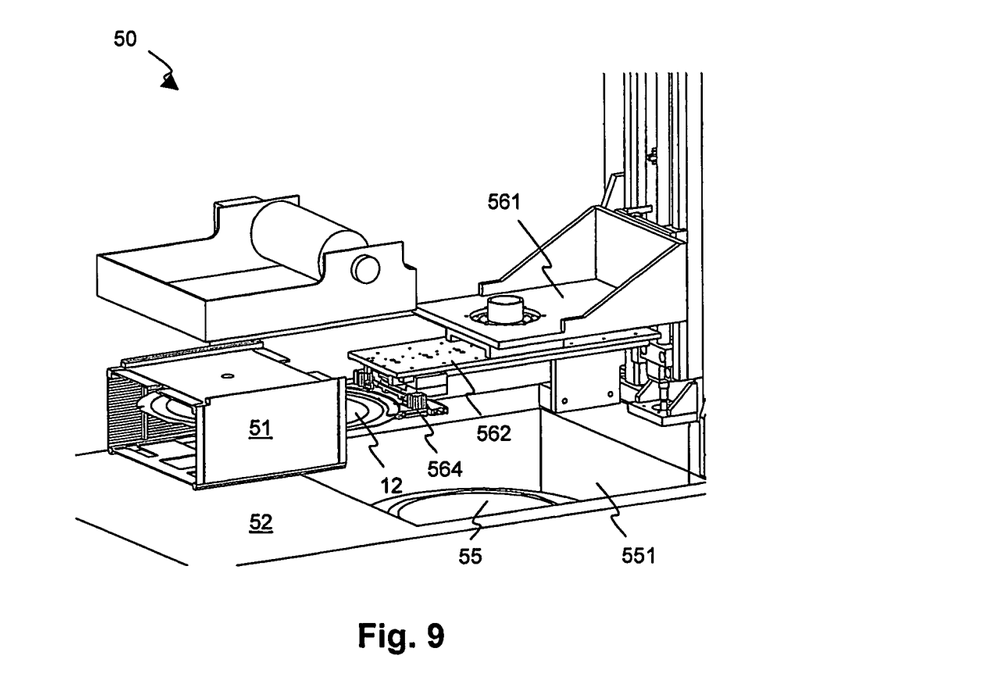
FIG. 9 is a diagrammatic perspective drawing of the laser machining apparatus of FIG. 5, illustrating replacing of the laser machined wafer substrate in the cassette holder subsequent to machining and cleaning.

As shown in FIG. 9, the wafer substrate 12 is then removed from the washing system 55 by moving the platform 561 away from the surface of the table or frame 52 to a distance from the surface sufficient to re-insert the machined and washed wafer substrate 12 into the cassette holder 51. The end effector 564 is extended to insert the wafer substrate 12 in the cassette holder 51 and the wafer substrate 12 released from the end effector 564 in the cassette holder 51.

Although a particular arrangement of apparatus has been described by way of example, it will be understood by the person skilled in the art that other arrangements of the component parts, and additional or fewer component parts, may be used.

In an alternative machine cycle, the wafer substrate 12 is returned to the wafer cassette holder 51 immediately after laser machining and remains therein until all wafers 12 in the cassette holder 51 have been sequentially pre-washed and laser machined. The entire batch of wafers in the cassette is then loaded into the washing system 55 and all wafers 12 are washed in one wash cycle, thus reducing machine cycling time for a wafer batch.

Where a same piece of hardware is used to prewash and dispense the surfactant and to wash the workpiece after laser machining, and where cycle time of machining is the same as or shorter than the dispensing or wash cycle time, throughput of the system may be improved through the use of a buffer. Specifically, wafers are sequentially passed through the dispense and dry step and fed into a buffer. The buffer is unloaded sequentially to feed wafers into the XY table where machining occurs and following machining the wafers are unloaded to the washer. Optimisation of the number of wafers in the buffer will depend on the number of wafers in a cassette as well as deposition and dry times, handling times, machining time and wash times. A correctly optimised buffer significantly increases throughput.

In a further embodiment of the invention, the camera system used to perform wafer alignment is used to detect and confirm the presence of surfactant on the wafer before machining. This for example may be achieved through use of an ideal or "golden" image of an ideal wafer. In further refinement, excess or insufficient surfactant may also be detected through comparison with images of workpieces with excess or insufficient surfactant. This method may be used as an inline control system to prevent machining of wafers which have, through operator error or machine fault, not received an amount of surfactant sufficiently close to an optimum amount.

In summary, the method of the present invention is to laser machine semiconductor substrates, for example, that have been pre-washed in a surfactant solution in order to reduce the adhesive properties of a surface of the substrate upon which laser machined debris will collect. This thin film of surfactant, and the debris deposited on the thin film of surfactant, are removed subsequent to laser machining of the substrate thus leaving the wafer surface free of debris and undamaged. This invention is applicable to, for example, laser dicing, laser scribing and laser via drilling in single substrate and multi-layer substrate materials consisting of layers such as plastic, dielectric, glass, metal and semiconductor materials.

The invention provides the advantages that the thin film of surfactant is easier to remove than known protective plastics films and the surfactant is compatible with known processing being similar to that used as a wetability agent in mechanical sawing of wafers. Thus, in a laser scribing process, where a dicing process or dicing saw is used in subsequent processing and the sawing process uses water as a coolant or lubricant, that water may also be used to remove the thin film of surfactant.

The invention claimed is:

1. A method of removing material by laser machining a workpiece that includes a substrate on which thermally sensitive electronic circuit component material is formed, and preventing damage to the thermally sensitive electronic circuit component material by material removed by the laser machining and deposited as resolidified material on a surface of the workpiece where the thermally sensitive electronic circuit component material resides, including the steps of:

prior to laser machining, dispensing a surfactant dissolved or suspended in a liquid carrier onto, and thereby forming a wet surfactant film on, the surface of the workpiece from which material is to be removed by laser machining, the surfactant having a sufficiently high degree of wettability to ensure that the wet surfactant film uniformly wets the surface and remains wet on the surface during laser machining, and the wet surfactant film being removable from the surface by dissolution in an aqueous washing solution;

evaporating the liquid carrier from the surface to form the wet surfactant film to reduce the adhesion properties of the surface;

laser machining the workpiece to remove material from the workpiece, the laser machining taking place in a gas environment so that at least some of the removed material is in gaseous form to cause deposition of a reduced portion of the removed material as resolidified material on the wet surfactant film; and using an aqueous washing solution, without chemical reaction or high-force agitation, to remove from the machined workpiece the deposited resolidified material and the wet surfactant film, thereby leaving undamaged any of the thermally sensitive electronic circuit component material covered by the deposited resolidified material.

2. The method of claim 1, wherein the surfactant is dispensed in a pre-wash of the workpiece.

3. The method of claim 1, wherein the step of dispensing the surfactant comprises dispensing the surfactant that is soluble in a solvent in which the surface of the workpiece is insoluble, and wherein the step of removing the deposited resolidified material and the wet surfactant film comprises dissolving the wet surfactant film in the solvent.

4. The method of claim 3, wherein the solvent is water.

5. The method of claim 1, wherein the step of laser machining the workpiece comprises laser machining a multilayer workpiece.

6. The method of claim 1, wherein the step of laser a machining the multilayer workpiece comprises machining a semiconductor wafer and associated layers forming the electronic circuit component material.

7. The method of claim 1, wherein the step of dispensing the surfactant comprises spray depositing the wet surfactant film on the surface.

8. The method of claim 1, wherein the step of dispensing the surfactant comprises dispensing an anionic or amphoteric wet surfactant.

9. The method of claim 1, wherein the step of dispensing the surfactant comprises coating the surface with a wet surfactant having a sufficiently high degree of wetting to wet substantially all the surface.

10. The method of claim 1, wherein the step of laser machining includes optimization of machining parameters and such optimization includes seeking to minimize adherence of the deposited resolidified material to the wet surfactant film.

11. The method of claim 1, wherein the workpiece includes a semiconductor wafer, and comprising the steps of:

removing a wafer from a wafer carrier;

transporting the wafer to a surfactant dispensing station and coating the surface of the wafer with a wet surfactant film to form a coated wafer;

transporting the coated wafer to a laser machining station and laser machining the coated wafer to form a machined coated wafer such that the reduced portion of the material removed by the laser machining is deposited on the wet surfactant film; and transporting the machined coated wafer to a surfactant removal station and removing the wet surfactant film and the deposited resolidified material to form an uncoated machined wafer.

12. A laser machining apparatus, comprising:

a surfactant dispenser arranged to dispense a wet surfactant film, the wet surfactant film comprising a surfactant having a sufficiently high degree of wettability to ensure that the wet surfactant film uniformly wets the surface of a workpiece from which material is to be removed by laser machining, the surfactant being dissolved or suspended in a liquid carrier evaporated from the surface to form, on the surface, the wet surfactant film reducing that reduces the adhesive properties of the surface, the wet surfactant film being removable from the surface by dissolution in an aqueous washing solution, and the workpiece including a substrate on which thermally sensitive electronic circuit component material is formed;

a laser emitting a laser beam for performing laser machining to remove material from workpiece, the laser machining causing deposition of a portion of the removed material as resolidified material collected on the wet surfactant film;

a gas environment controller for producing a gas environment for the laser machining, the laser machining in the gas environment causing at least some of the removed material to be in gaseous form and thereby resulting in a reduction in the deposited portion of the removed material; and a washing system using an aqueous washing solution, without chemical reaction or high-force agitation, to remove from the machined workpiece the deposited resolidified material and the wet surfactant film and thereby leave undamaged any of the thermally sensitive electronic circuit component material covered by the deposited resolidified material.

13. The laser machining apparatus of claim 12, wherein the surfactant dispenser comprises a pre-washing device.

14. The laser machining apparatus of claim 12, wherein the washing system comprises a spin-rinse-dry mechanism.

15. The laser machining apparatus of claim 12, wherein the washing system comprises a post-washing device.

16. The laser machining apparatus of claim 15, wherein the surfactant dispenser comprises a pre-washing device, and the pre-washing device and the post-washing device are the same washing device.

17. The laser machining apparatus of claim 12, wherein the surfactant dispenser comprises a spray deposition mechanism.

18. The laser machining apparatus of claim 12, comprising: a surfactant dispensing station that includes the surfactant dispenser; a laser machining station from which the laser beam is emitted for performing the laser machining; a wet surfactant film removal station that includes the washing system; and a transport mechanism for transporting the workpiece from the surfactant dispensing station to the laser machining station and from the laser machining station to the wet surfactant film removal station.

19. The laser machining apparatus of claim 12, wherein the wet surfactant film is not more than 10 microns thick.

20. The laser machining apparatus of claim 12, wherein the wet surfactant film is an anionic or amphoteric film.

* * * * *